T. VARNEY.
TROLLEY.
APPLICATION FILED APR. 5, 1907.
932,653.
Patented Aug. 31, 1909.
2 SHEETS—SHEET 1.
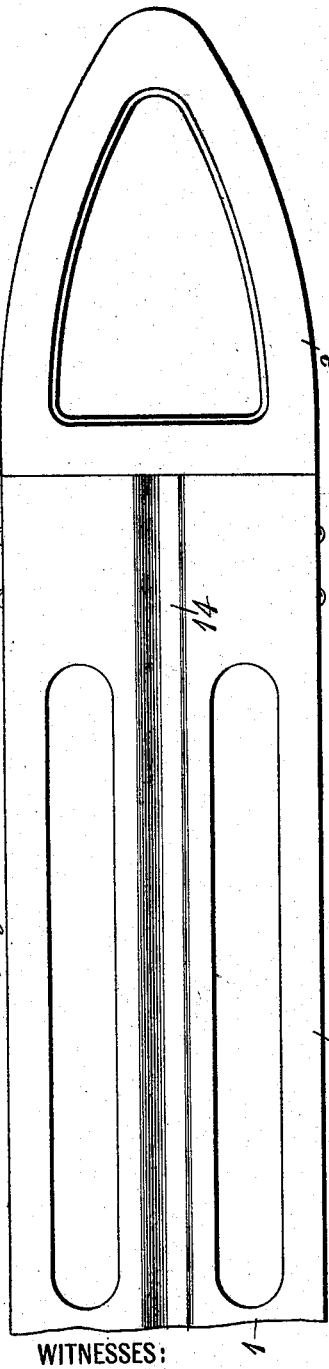
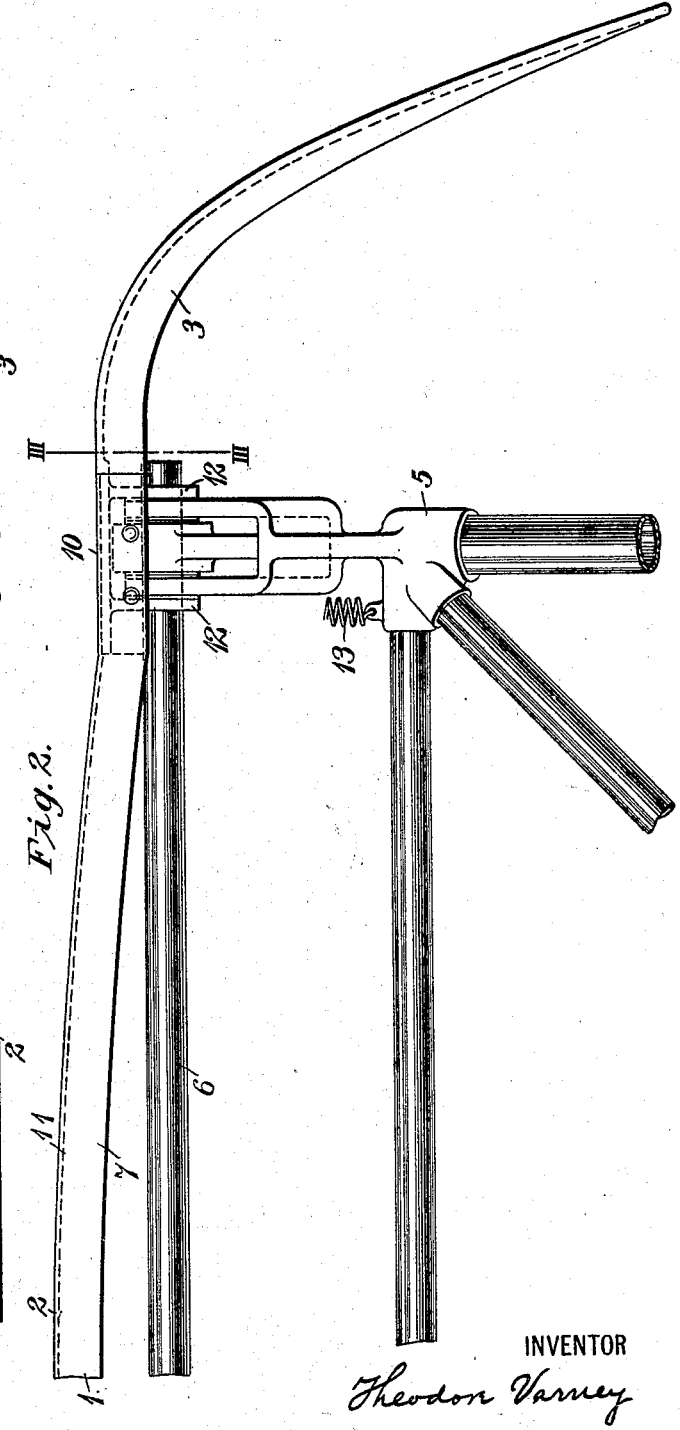
WITNESSES:
Fred H Miller
INVENTOR
Theodon Varney
BY
ATTORNEY T. VARNEY.
TROLLEY.
APPLICATION FILED APR. 5, 1907.
932,653.
Patented Aug. 31, 1909.
2 SHEETS—SHEET 2.
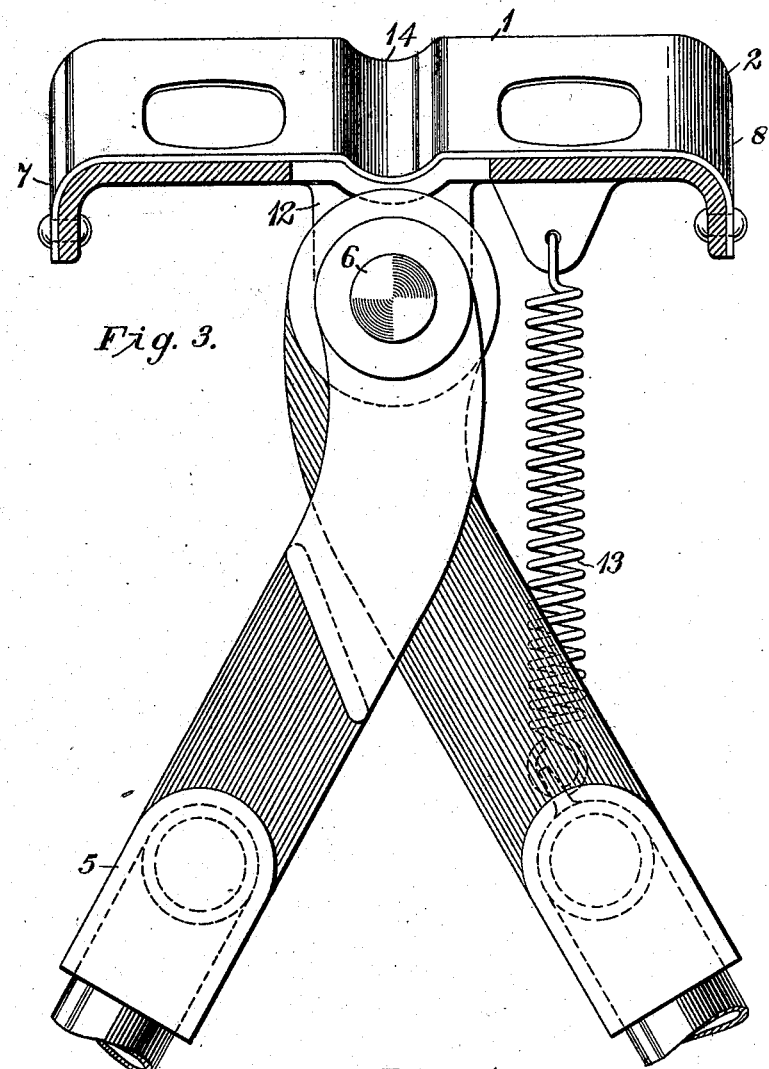
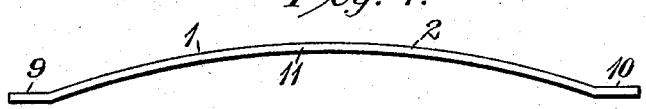
WITNESSES:
Fred H. Miller
R. J. Dearborn
INVENTOR
Theodore Varney
BY
ATTORNEY

UNITED STATES PATENT OFFICE.

THEODORE VARNEY, OF PITTSBURG, PENNSYLVANIA, ASSIGNOR TO WESTINGHOUSE ELECTRIC & MANUFACTURING COMPANY, A CORPORATION OF PENNSYLVANIA.

TROLLEY.

932,653.  Specification of Letters Patent.  Patented Aug. 31, 1909.

Application filed April 5, 1907. Serial No. 366,502.

*To all whom it may concern:*

Be it known that I, THEODORE VARNEY, a citizen of the United States, and a resident of Pittsburg, in the county of Allegheny and State of Pennsylvania, have invented a new and useful Improvement in Trolleys, of which the following is a specification.

My invention relates to trolleys for electrically propelled vehicles and it has for its object to provide a device of this character which shall be specially adapted to transmit large amounts of electrical power from a stationary line conductor to vehicles operating at high speeds.

It is a well known fact that sliding or bow trolleys have been found preferable to other types for high speed service and particularly where relatively large amounts of electrical power are transmitted from the supply line through a single contact member.

A spring pressure has usually been exerted upon the contact shoe to hold it in engagement with the supply conductor but, on account of the inertia of the moving parts and the unavoidable irregularities in the suspension of the supply conductor, the contact member is, at times, separated from the supply conductor and destructive electric arcs result.

According to my present invention, I provide a relatively light contact shoe whereby the inertia of the trolley is materially reduced and consequently is adapted to follow the variations in the supply line conductor more closely than the relatively heavy contact members of the prior art.

Other advantages of my improved contact shoe will be hereinafter pointed out.

Figure 1, of the accompanying drawings, is a plan view and Fig. 2 is a side elevation of a portion of a trolley construced in accordance with my invention. Fig. 3 is a sectional elevation on the line III—III of Fig. 2, and Fig. 4 is an outline view, on a smaller scale, of the contact shoe as shown in the other figures.

Reference may now be had to the drawings in which like parts are designed by similar reference numerals.

A contact shoe 1 comprising a body portion 2 of sheet metal and end castings 3 attached thereto, is mounted upon a suitable frame structure 5 (the uppermost portion of which is disclosed in the drawings). The contact shoe of my invention is well adapted for use in connection with a pantagraph frame, but is, of course, not restricted to this form of support. A rod 6 is supported at both ends of the contact shoe by the frame 5, the contact shoe being rotatably mounted on this rod as an axis.

The body portion 2 of the contact shoe is constructed from relatively thin sheet steel or other suitable metal and is so formed as to have side flanges 7 and 8, relatively short and flat end portions 9 and 10 and a middle portion 11 which is bowed slightly from end to end. In this way, a very rigid and relatively light contact member is provided and, in order to prevent rusting of the shoe and also to provide a lubricating effect between the shoe and the trolley conductor, I galvanize the shoe or coat it with a suitable lubricating and weather resisting material. The end castings 3 extend outwardly and downwardly and are so formed as to provide bearing projections 12 through which the rod 6 projects. The contact shoe is kept in a substantially horizontal plane by springs 13 (only one of which is shown) that connect opposite sides and opposite ends of the shoe with an arm of the frame 5 which is directly beneath the point of connection with the shoe. The shoe is held in engagement with the trolley conductor by reason of a pressure which is exerted upon the lower parts of the supporting frame 5 by any suitable means, such as springs or fluid pressure. It will usually be found desirable to provide a centrally located longitudinal groove 14 in the contact shoe in which lubricating fluid may be placed.

The advantages of a relatively light steel contact shoe have been demonstrated in service and it has been particularly observed that the tendency which has existed in the contact members heretofore used to become grooved by the wear of the trolley conductors is entirely obviated. Furthermore, the wear of the trolley itself by contact with the shoe is materially reduced by the use of a zinc coating which reduces the friction between the engaging surfaces.

I claim as my invention:

1. A contact shoe for trolleys comprising a steel plate, the contact surface of which is plated with zinc.

2. A contact shoe for trolleys comprising a galvanized steel plate bowed slightly and supported only at its ends.

3. A contact shoe for trolleys comprising a galvanized sheet metal plate having its middle portion bowed slightly and supported only at its ends.

4. A trolley for electric railways comprising a supporting frame and a galvanized steel contact plate having an upward curvature from end to end.

5. A trolley for electric railways comprising a supporting frame and a galvanized steel contact plate having an upward curvature from end to end and a longitudinal groove or recess.

In testimony whereof, I have hereunto subscribed my name this 29th day of March, 1907.

THEODORE VARNEY.

Witnesses:
  WESLEY G. CARR,
  BIRNEY HINES.